US008645346B2

(12) United States Patent
Dumitru et al.

(10) Patent No.: US 8,645,346 B2
(45) Date of Patent: Feb. 4, 2014

(54) COMPOSABLE SQL QUERY GENERATION

(75) Inventors: Marius Dumitru, Sammamish, WA (US); Jeffrey Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 13/161,522

(22) Filed: Jun. 16, 2011

(65) Prior Publication Data

US 2012/0323956 A1  Dec. 20, 2012

(51) Int. Cl.
G06F 17/30 (2006.01)

(52) U.S. Cl.
USPC .......................................... 707/705; 707/769

(58) Field of Classification Search
USPC ................................. 707/705, 769
See application file for complete search history.

(56) References Cited

U.S. PATENT DOCUMENTS

| | | | |
|---|---|---|---|
| 6,578,027 B2 | 6/2003 | Cambot et al. | |
| 7,181,450 B2 | 2/2007 | Malloy et al. | |
| 7,337,177 B2 | 2/2008 | Rys et al. | |
| 7,640,254 B2 | 12/2009 | McConnell | |
| 7,668,818 B2 | 2/2010 | Hou et al. | |
| 7,689,582 B2 * | 3/2010 | Behnen et al. | 707/999.102 |
| 7,877,379 B2 | 1/2011 | Waingold et al. | |
| 2007/0027905 A1 | 2/2007 | Warren et al. | |
| 2007/0214171 A1 * | 9/2007 | Behnen et al. | 707/102 |
| 2007/0244876 A1 * | 10/2007 | Jin et al. | 707/5 |
| 2007/0299836 A1 | 12/2007 | Hou et al. | |
| 2009/0319498 A1 | 12/2009 | Zabokritski et al. | |
| 2009/0319501 A1 | 12/2009 | Goldstein et al. | |
| 2010/0332548 A1 | 12/2010 | Gibson et al. | |
| 2011/0087954 A1 | 4/2011 | Dickerman et al. | |
| 2012/0059839 A1 * | 3/2012 | Andrade et al. | 707/760 |
| 2012/0166417 A1 * | 6/2012 | Chandramouli et al. | 707/713 |
| 2012/0166469 A1 * | 6/2012 | Cammert et al. | 707/769 |
| 2013/0173587 A1 * | 7/2013 | Imaki et al. | 707/713 |

OTHER PUBLICATIONS

"Streaming Analytics for Real-time Business Intelligence", Retrieved at <<http://www.sqlstream.com/Resources/SQLstream_RT_Streaming_BI.pdf>>, Retrieved Date: Apr. 6, 2011, pp. 2.
"Concepts in Streaming SQL", Retrieved at <<http://www.sqlstream.com/Resources/ConceptsInStreamingSQL.pdf>>, Dec. 2009, pp. 6.
Masood, Adnan., "Business Intelligence with Microsoft SQL Server Reporting Services—Part 1", Retrieved at <<http://www.15seconds.com/issue/041013.htm>>, Retrieved Date: Apr. 6, 2011, pp. 14.
Utley, Craig., "Solving Business Problems with SQL Server 2005 Analysis Services", Retrieved at <<http://technet.microsoft.com/hi-in/library/cc966452(en-us).aspx>>, Apr. 1, 2005, pp. 10.

* cited by examiner

*Primary Examiner* — Kim Nguyen

(57) ABSTRACT

A system and method for facilitating querying one or more data sources. A system provides mechanisms to enable flexible specification of user queries and generation of one or more SQL queries that correspond closely to corresponding user queries. An operator tree and a logical operator tree may be created as intermediate steps to generate the one or more SQL queries. Capabilities of data sources are determined and used to generate remotable SQL queries for composable queries, to reduce an amount of post-processing that is performed on result sets. The system enables user queries that extend beyond those defined by a data model.

20 Claims, 11 Drawing Sheets

COMPOSABLE SQL QUERY GENERATION

BACKGROUND

Some business intelligence (BI) systems retrieve and process data from remote data sources, storing the data in local storage. User queries are answered by retrieving the cached data from the local storage. In some BI systems, a query processing system receives a user query and translates the query into a set of remote SQL queries. The user query may be in the form of a text string based on a query language. The set of remote SQL queries may be sent to one or more remote SQL databases. Upon receiving the result sets from the one or more remote SQL databases, the query processing system may perform post-processing to assemble an answer to the original user query. Examples of post-processing may be combination operations or result set manipulation operations. A combination operation is one that combines two or more result sets. Examples of combination operations are joins, or unions. A manipulation operation is one that changes the ordering or grouping of a result set or limits the number of rows or data elements in the result set. Examples of manipulations operations are aggregations, orderby, groupby, filters, or the like.

Some user queries may be translated into multiple queries that are sent to a single remote SQL database. The multiple result sets are then post-processed to create a single set of results as an answer to the original query.

A query processing system may employ a data model, created by a modeler. A data model, or simply a model, may include metadata that specifies the available fields, field properties, measures, and definitions of measures. The term "fields" refers to columns in tables. The data model may specify the data sources corresponding to each table. A model may also specify relationships between tables. A client system may retrieve metadata from the model to facilitate setting up a user interface to a user. The user interface may guide the user as to the available data, and enables the user to select combinations of available fields and measures. The user does not need to know how the data is retrieved, combined, or otherwise processed. Though a model facilitates querying by a user, it typically limits queries to those enabled by the model itself, though the source databases are not so restrictive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to receive a user query, generate one or more SQL queries based on the user query, and send each SQL query to a corresponding data source. Mechanisms minimize the number of SQL queries that are sent to each data source. In some configurations, in which each data source supports the operations that are to be performed, one SQL query is sent to each corresponding data source.

In one embodiment, user queries that are to be directed to a single data source may result in a single result set returned by the data source. The single result set may be sent to a client device without post-processing. In some embodiments, the single result set may be streamed to the client device.

In one embodiment, a user query may be translated into an operator graph based on a data model. The operator graph may be translated into a logical operator graph. Some logical operator graphs may represent composable SQL queries including multiple sub-queries.

In one embodiment, if multiple result sets are received, the multiple result sets may be combined by a post-processor to produce a user response.

In one aspect of the mechanisms described herein, mechanisms may include generating a minimum number of SQL queries so that a minimum amount of post-processing is performed and a number of data elements returned from one or more data sources is the same as the number of data elements sent as the user response.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
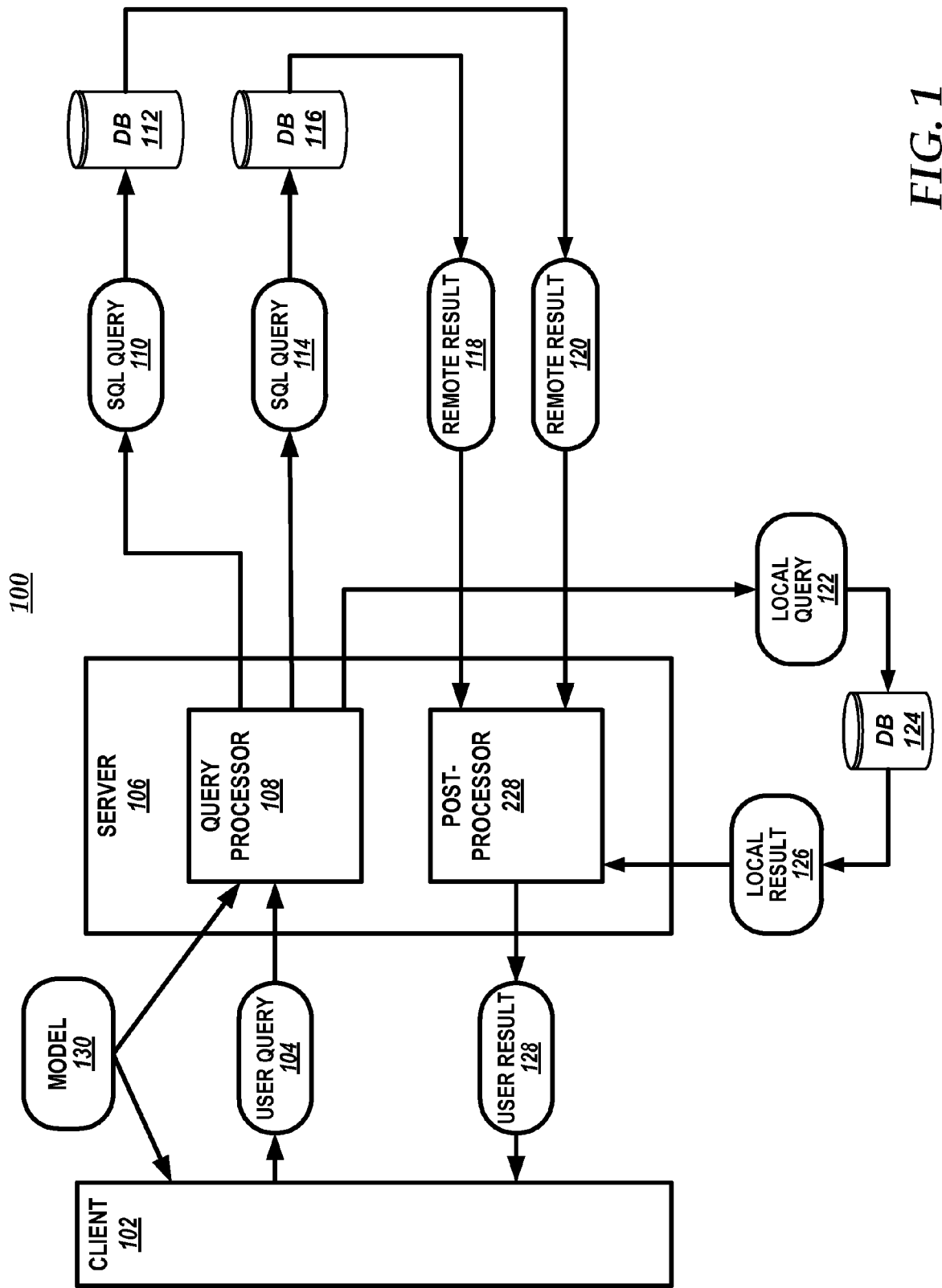
FIG. 1 is a block diagram of an example system in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an example system 100 in which embodiments may be practiced. FIG. 1 provides a basic understanding of an example system, though many configurations may be employed and many details are not illustrated in FIG. 1. As illustrated in FIG. 1, an example system 100 includes client 102. Client 102 may be a handheld computing device, a laptop, smartphone, or other portable computing device, a desktop computer, server, or other relatively stationary computing device. In various systems, clients may be in the form of any one or more computing devices, computer processes, modules, or similar component. Client 102 may include a user interface (UI) that facilitates construction of a user query. The UI may be a graphical user interface (GUI).

In one embodiment, example system 100 includes model 130, which contains data descriptive of one or more data sources that may be queried. The descriptive data, also referred to as metadata, may specify data fields, field attributes or properties, data tables, relationships between data fields or tables, or other data descriptive of data sources. A model may specify or define operations that may be performed on data. A model may include one or more measures. A measure may have a name representing data that a user query may refer to by name. The query processor may translate the named reference to one or more calculations that produce the desired data based on filters, as specified by the user, though the filter context is not included in the model. For example, a user may create a report specifying a month field and a product category field as a filter context, and then add a measure named YTDSales. The query processor may generate a query that calculates the values of YTDSales for each combination of month and product category, though this context is not specified in the model.

A model may restrict the types of user queries that can be generated, by exposing a subset of available data, a subset of available operations, or a subset of the ways in which data can be retrieved or combined. Generally, a person known as a modeler creates a model for use with client 102 and data sources 112 or 116.

In the example system client 102 receives model 130 and facilitates creation of user query 104 based on the model. In the example system, server 106 receives user query 104 from client 102. Though illustrated as a single server, server 106 may represent one or more servers, each of which may be implemented in the form of a computing device, a blade in a chassis, a processor in a computing device, or a process executing on a computing device.

In the illustrated example system, server 106 includes query processor 108, which receives user query 104, performs various translations, and generates one or more SQL queries such as SQL queries 110 and 114. Each SQL query may be sent to a remote data source, such as data sources 112 and 116. Though the example system illustrates two SQL queries being generated and each one sent to a respective one of two data sources, in various configurations, one, two, or more data sources may be employed. Data sources 112 and 116 may be provided by a single vendor or multiple database vendors. In some configurations, each data source may employ a dialect of SQL that is the same or different from the others. One or more SQL queries may be sent to each data source. Some queries may employ less data sources than are available in the system. In some configurations, data sources may employ different interface technologies, or have different sets of operator capabilities. The different data sources may be products of different database providers. The system may be used in different configurations, each with data sources of different database providers or using different data access technologies, or with different sets of operator capabilities.

As further illustrated in example system 100, each data source 112 or 116 may send a remote result set in response to receiving an SQL query. As illustrated, data sources 112 and 116 send remote results 118 and 120, respectively, to server 106. Though not illustrated in FIG. 1, some queries may result in multiple SQL queries sent to one data source, with one remote result set returned for each SQL query received.

Server 106 may include post-processor 228, which receives each remote result returned from a data source. As discussed herein, post-processor 228 may perform processing of remote results 118 or 120, generate a user result 128, and send user result 128 to client 102. Post-processor 228 is a specific type of response management component that performs post-processing actions. As discussed herein, some response management components may not perform post-processing actions and may perform other actions.

As illustrated, in response to receiving user query 104, query processor 108 may also send one or more local queries 122 to local data source 124. Local data source 124 may be integrated with server 106 or communicate with server 106 by a direct connection or a local area network. Local data source 124 may send a local result corresponding to each received local query to post-processor 228. As for the remote results, post-processor 228 may perform processing of local results 126 to generate user result 128. Thus, query processor 108 may generate one or more queries, sending each query to a remote data source or a local data source; a response management component may receive one or more result sets, generate user result 128, and send user result 128 to client 102. As discussed further herein, in response to some queries, query processor 108 may send a single SQL query to a single remote data source, receive a single result set, and forward the result set as the user result, without performing post-processing. In this situation, a response management component may perform actions to cause the result set to be streamed to the client. For example, in one embodiment, a response management component may receive results and stream them to the client. In one embodiment, a response management component may perform actions to configure another component, such as the data source, to stream the result set to the client. Thus, in one embodiment, a result set may be streamed directly to the client, bypassing server 106.

Though not illustrated, client 102, server 106, and remote data sources 112 or 116 may communicate with each other through a communications network. A communications network may include a local area network, a wide area network, direct connections, or a combination thereof. In one embodiment, a network includes the Internet, which is a network of networks. The network may include wired communication mechanisms, wireless communication mechanisms, or a combination thereof. Communications between client 102, server 106, remote data sources 112, or other computing devices may employ one or more of various wired or wireless communication protocols, such as IP, TCP/IP, UDP, HTTP, SSL, TLS, FTP, SMTP, WAP, Bluetooth, or WLAN.

Figure 10:
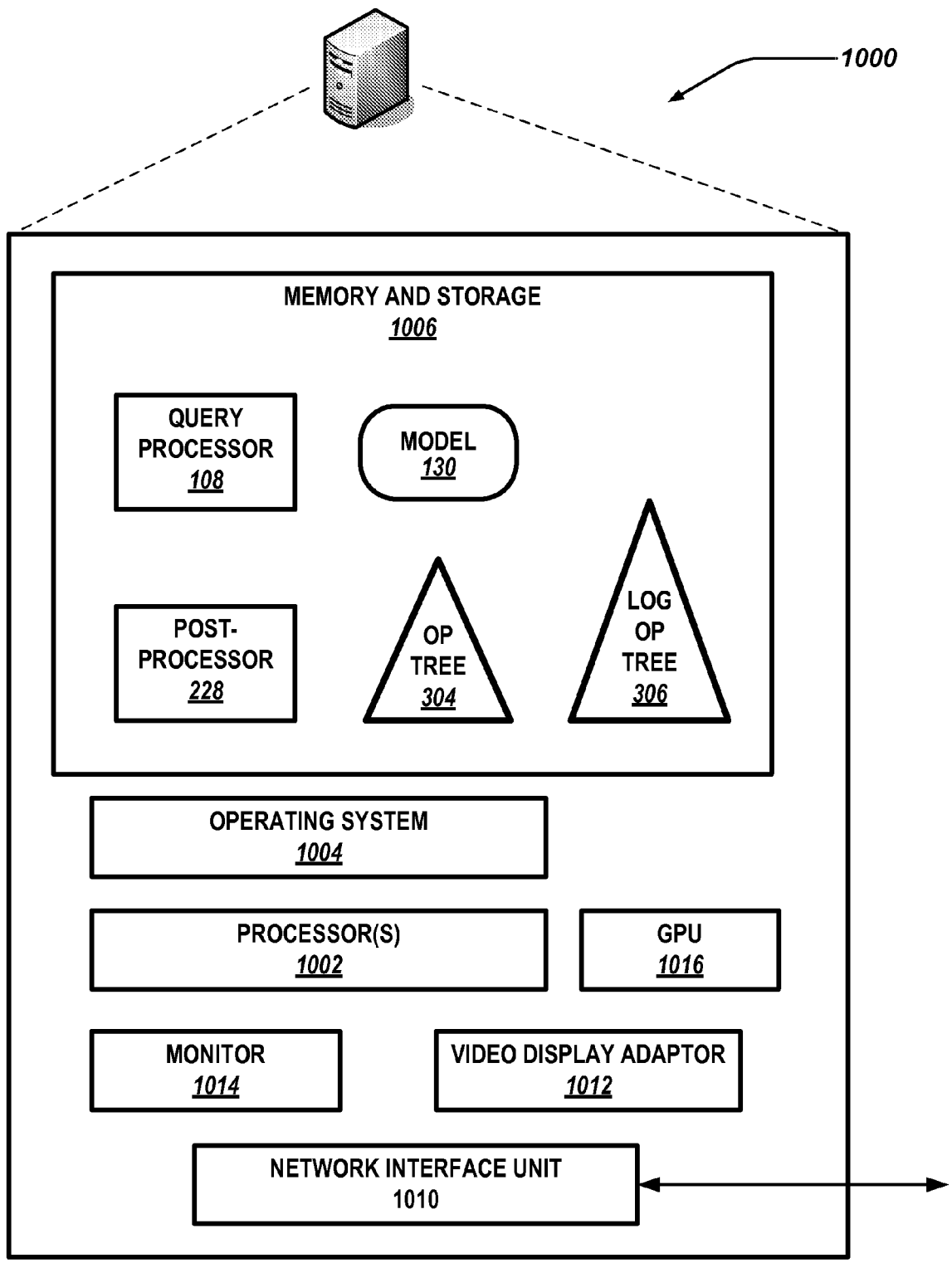
FIG. 10 is a block diagram showing one embodiment of a computing device 1000, illustrating selected components of a computing device that may be used to implement mechanisms described herein.

In one embodiment, each of client 102, server 106, and data sources 112 and 116 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device. FIG. 10 illustrates an example embodiment of a computing device that may be used to implement server 106. Local data source 124 may be implemented by a computing device separate from server 106, or it may be integrated with server 106.

Figure 2:
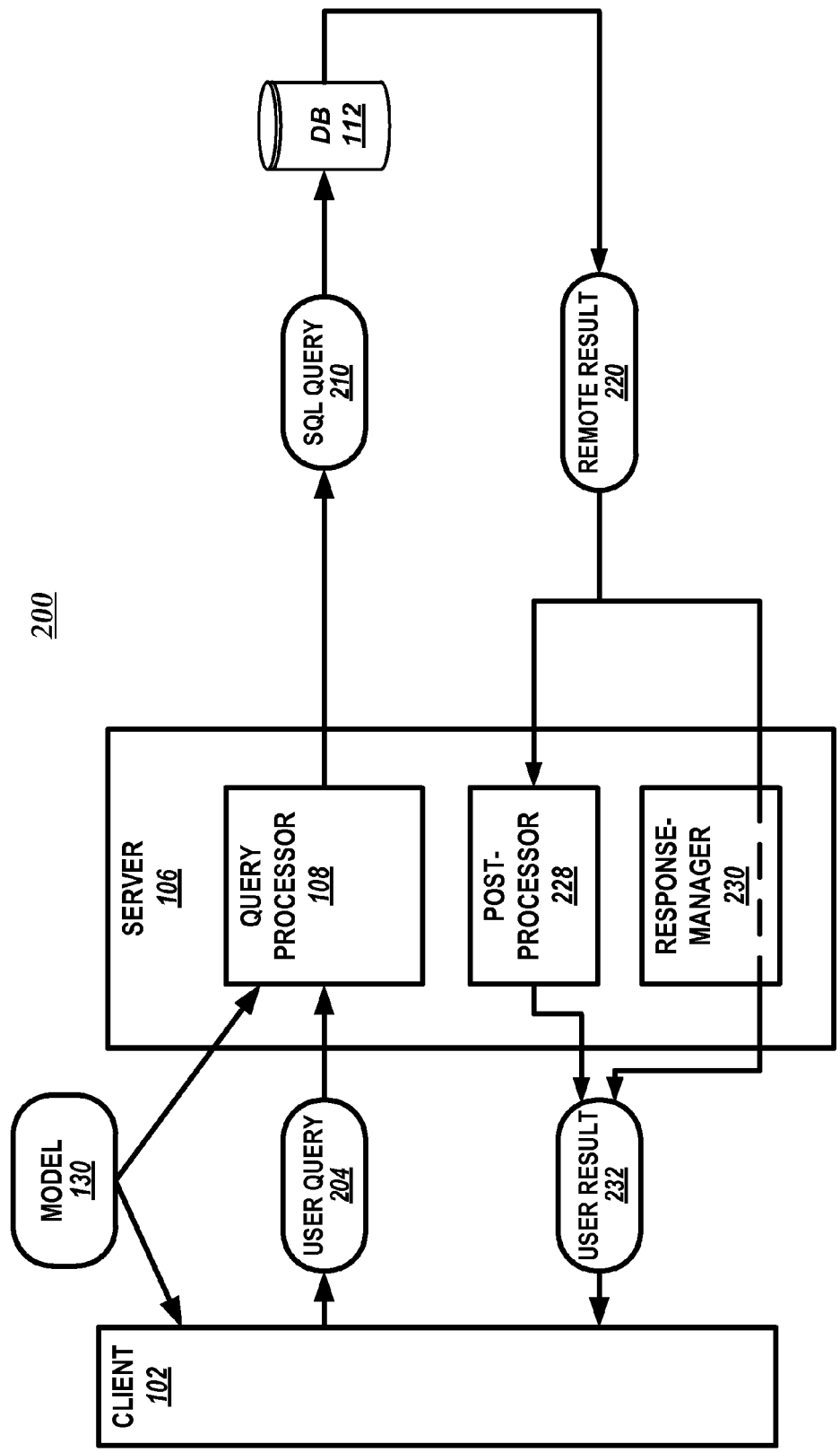
FIG. 2 is a block diagram of an example system in which mechanisms described herein may be deployed.

FIG. 2 is a block diagram of an example system 200 in which mechanisms described herein may be deployed. The illustrated example system 200 includes a subset of the components illustrated in system 100 of FIG. 1. It illustrates mechanisms that may be employed in a configuration in which a user query may be processed and responded to by accessing one remote data source.

Example system 200 includes client 102, server 106, query processor 108, and remote data source 112, as described with respect to FIG. 1. As illustrated, query processor 108 receives user query 204 from client 102. In response, query processor 108 performs various translations, generates one SQL query 210, and sends SQL query 210 to on remote data source 112. In response, remote data source 112 sends one remote result 220 to server 106. Upon receiving remote result 220, response manager component 230 of server 106 may send it to client 102 as user result 232, without performing post-processing. In one configuration, server 106 may facilitate streaming of remote result 220 to client 102. In one implementation, response manager component 230 may begin streaming initial data received in remote result 220 while receiving additional data. For example, upon receiving a first row of data, response manager component 230 may stream the first row to client 102, while concurrently receiving one or more subsequent rows of data. In one embodiment response management component 230 may configure a data source to stream results directly to a client device.

As used herein, post-processing refers to processing of data to modify the amount of data, combining multiple result sets into one result set, or performing calculations or operations on the data. This may include combination operations, manipulations operations, or scalar functions. For example, performing joins, summations, implementing a filter, or aggregations of data are each examples of post-processing. Processing such as changing formatting is not considered to be post-processing, as used herein. Thus, system 200 provides an example of query processing in which post-processing is not performed. In one embodiment, a complex user query may be processed, and one or more SQL queries generated so that the amount of data returned from the one or more data sources is equivalent to the amount of data requested by the user query. Therefore, server 106 may return all of the response data it receives, without filtering or limiting the number sent to the user.

Figure 3:
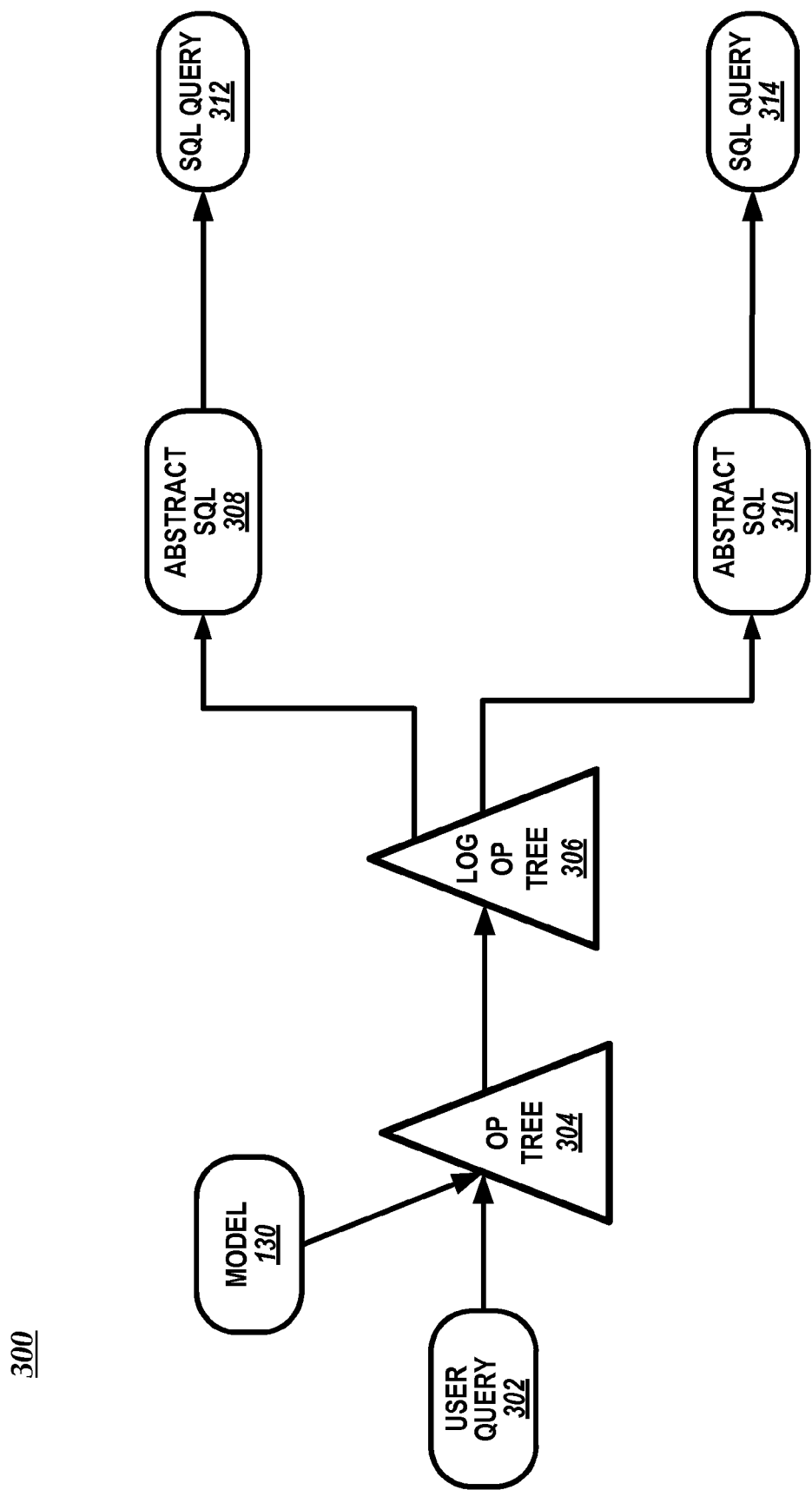
FIG. 3 is a block diagram of an example data flow which may be performed in some embodiments of mechanisms described herein.

FIG. 3 is a block diagram of an example data flow 300 which may be performed in some embodiments of mechanisms described herein. Data flow 300 illustrates processing of a user query and generation of one or more SQL queries. Data flow 300 may be employed in conjunction with system 100 of FIG. 1. A portion of data flow 300 may be employed in conjunction with system 200 of FIG. 2.

As illustrated, data flow 300 includes user query 302, which may be any of user queries 104 or 204 of FIG. 1 or 2, or another user query. User query 302 may be processed to generate operator tree 304. Briefly, an operator tree is a representation of a user query, and may be generated by employing metadata from model 130. For example, model 130 may specify relationships between data tables. Query processor 108 may insert the relevant relationships between tables, so that joins or other operations may be specified based on the user query. An operator tree may specify columns that are to be used in SQL queries, though they are not explicitly specified in the user query. Thus, an operator tree combines information from the model with the user query to facilitate generation of SQL queries. Operator trees are described in further detail herein.

In one implementation, a user query is specified using data analysis expressions (DAX). DAX is a formula language that includes a number of functions, operators, and constants that may be combined to form expressions. The system is not limited to DAX user queries, however. In one embodiment, the system may receive multiple user queries specified using different formula languages or query languages, and apply the mechanisms described herein to each user query. It is to be noted that the mechanisms described herein may be applied with various combinations of user query languages and data sources employing different operator capabilities, and is not limited to a language designed for a specific vendor's data source.

As illustrated in FIG. 3, in one implementation operator tree 304 may be transformed to logical operator tree 306. In one implementation, the transformation of an operator tree to a logical operator tree uses model metadata that indicates a data source for each item of data. In a configuration using multiple data sources, sub-trees of the logical operator tree may correspond to respective data sources. In one implementation, each node of each sub-tree corresponds to a constant value or an operation supported by the respective data source. More specifically, in one implementation, each intermediate node of a logical operator sub-tree represents an operation supported by the data source. This may be an SQL operation, such as a join, select, or union, or a function supported by the data source. Examples of such functions include arithmetic functions, string operators, date or time functions, Boolean functions, comparison functions, or the like. A sub-tree of the logical operator tree that corresponds to a particular data source is designed so that the data source may return a result set based on the operations specified therein. Such a sub-tree is referred to as a remotable sub-tree.

In one implementation, the operator tree or the logical operator tree are represented astree structures. However, in some implementations, a directed graph structure that is not a tree structure may be employed. Such a structure may be referred to as an operator graph or logical operator graph, respectively. It is understood that an operator tree and logical operator tree are specific case of an operator graph, and that discussion of a tree structure is applicable to a graph structure, unless stated otherwise.

As further illustrated in FIG. 3, logical operator tree 306 may be transformed into one or more abstract SQL queries. An abstract SQL query is a query that is equivalent to an SQL query, though it may be in a different format. In particular, an abstract SQL query is a text representation of a remotable logical operator subtree. An abstract SQL query may be translated into different SQL dialects, and thus is not necessarily particular to one SQL dialect. Various database providers may employ a variety of SQL dialects. Use of an abstract SQL query therefore facilitates use of the mechanisms herein described with a variety of database vendors. Data sources from multiple vendors using various SQL dialects may be combined in one system, as illustrated in FIG. 1. In one implementation, abstract SQL queries 308 and 310 are XML representations of corresponding SQL queries. Each abstract SQL query 308 and 310 may be translated into its equivalent SQL query 312 and 314, respectively. SQL queries 312 or 314 may be SQL queries 110, 114, 210, or other queries. For various user queries, one or more SQL queries may be produced.

In one implementation, a cartridge file corresponding to each data source is used to transform abstract SQL into a dialect of SQL that is specific to a data source. A data source may have multiple cartridge files, each file corresponding to a respective version. A cartridge file specifies the capabilities of its corresponding data source. This may include a specification of the functions or operators it supports. Operators may include relational operators, which receive two tables as input and produce an output table. Filter, union, and intersect are examples of relational operators. Operators may also include scalar operators. A cartridge file may be used to determine logical operator sub-trees that are remotable. In particular, they may be used to determine a maximum sub-tree that is remotable, for each remotable sub-tree.

In one implementation, the transformation from user query 302 to operator tree 304, the transformation from operator tree 304 to logical operator tree 306, the transformation from logical operator tree 306 to abstract SQL queries 308 and 310, and the transformations from abstract SQL query 308 and abstract SQL query 310 to SQL query 312 and 314, respectively, are performed by query processor 108. In some implementations, one or more of these transformations may be performed by other components that are invoked by query processor 108.

Figure 4:
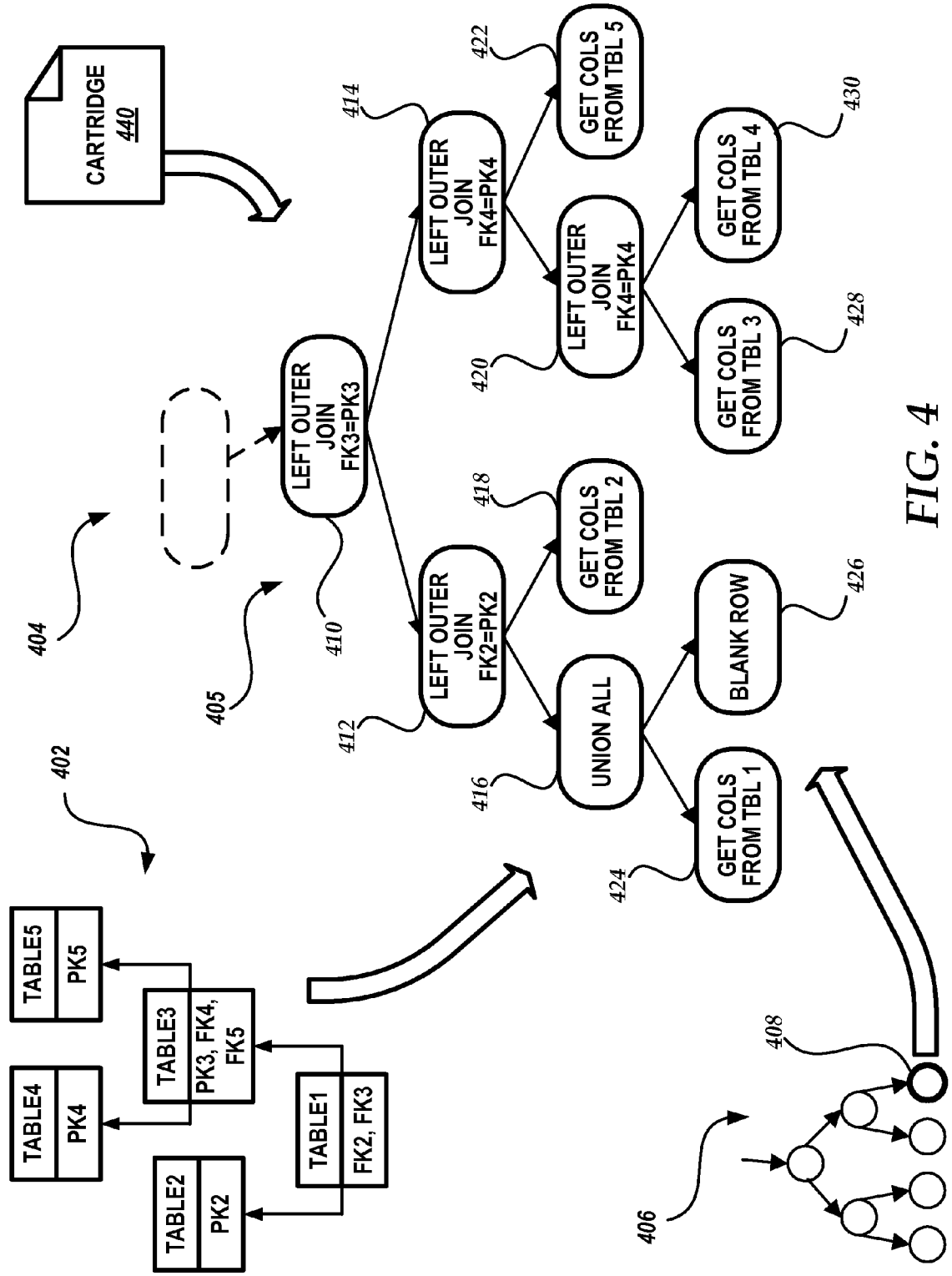
FIG. 4 is a block diagram illustrating example data structures that may be used or generated in accordance with mechanisms described herein.

FIG. 4 is a block diagram illustrating example data structures that may be used or generated in accordance with mechanisms described herein. FIG. 4 includes a portion of example model 402, a portion of example operator tree 406, and a portion of example logical operator tree 404. Model 402, operator tree 406, or logical operator tree 404 may be model 130, operator tree 304, or logical operator tree 306 respectively, of FIG. 3.

As illustrated in FIG. 4, model 402 includes specifications of data tables, fields within each data table, and relationships between the data tables. Operator tree 406 includes various nodes, and in particular, leaf node 408. Example logical operator tree 404 includes a number of nodes, each node specifying a data retrieval or operation performed on retrieved data. A logical operator tree may be divided into one or more branches, or sub-trees. Example logical operator tree 404 includes branch 405, which corresponds to a single data source. As illustrated branch 405 includes leaf nodes 418, 422, 424, 426, 428, and 430. A leaf node is a node that has zero child nodes. Example logical operator tree 404 includes internal nodes 410, 412, 414, 416, and 420. An internal node is a node that has one or more child nodes.

In one embodiment, leaf nodes represent low level detail data, such as one or more columns of a table from a data source or a constant value. In some implementations, a leaf node represents all of the columns from a single physical table that are to be used in the query. As illustrated, each of leaf nodes 418, 422, 424, 428, and 430 represent a corresponding set of one or more data columns; leaf node 426 represents a blank row.

In one embodiment, internal nodes represent operations to be performed on data of child nodes, which may be leaf nodes or sub-trees. As illustrated, each of internal nodes 410, 412, 414, and 420 represents a join operation; internal node 416 represents a union operation. Examples of other operations that may be represented by internal nodes include filters, "group by", "order by", aggregations, or various SQL functions. In particular, some operations represented by an internal node correspond to an SQL operation that is supported by the data source to which the node is targeted. Some operations may be unsupported by the targeted data source. As discussed herein, a node representing an unsupported operation is not remotable. The operation may be performed during post-processing, as discussed at block 512 of FIG. 5.

FIG. 4 illustrates an example of a mechanism described herein, in which an operator tree is converted into a logical operator tree. FIG. 4 illustrates a portion of such a conversion, in which leaf node 408 of operator tree 406 is converted into a branch 405 of logical operator tree 404. Metadata from model 402 is used to perform this conversion.

As discussed herein, in one embodiment, cartridge 440 may be used to determine remotable sub-trees of logical operator tree 404. In particular, a set of maximum remotable sub-trees may be determined, based on the capabilities of each data source, as provided by corresponding cartridges. Determining maximum remotable sub-trees may result in a minimum of SQL queries.

In one implementation, the cartridge includes an extensible style sheet language transformation (XSLT) script, though other representations may be used. The XSLT script may be used to translate an abstract query into an SQL query for the target data source. It may insert data type cases, handle database nulls, perform special handling of Boolean or date/time expressions, or perform other translations. In some implementations, a data source may have more than one cartridge file, each one corresponding to a version of the data source.

Figure 5:
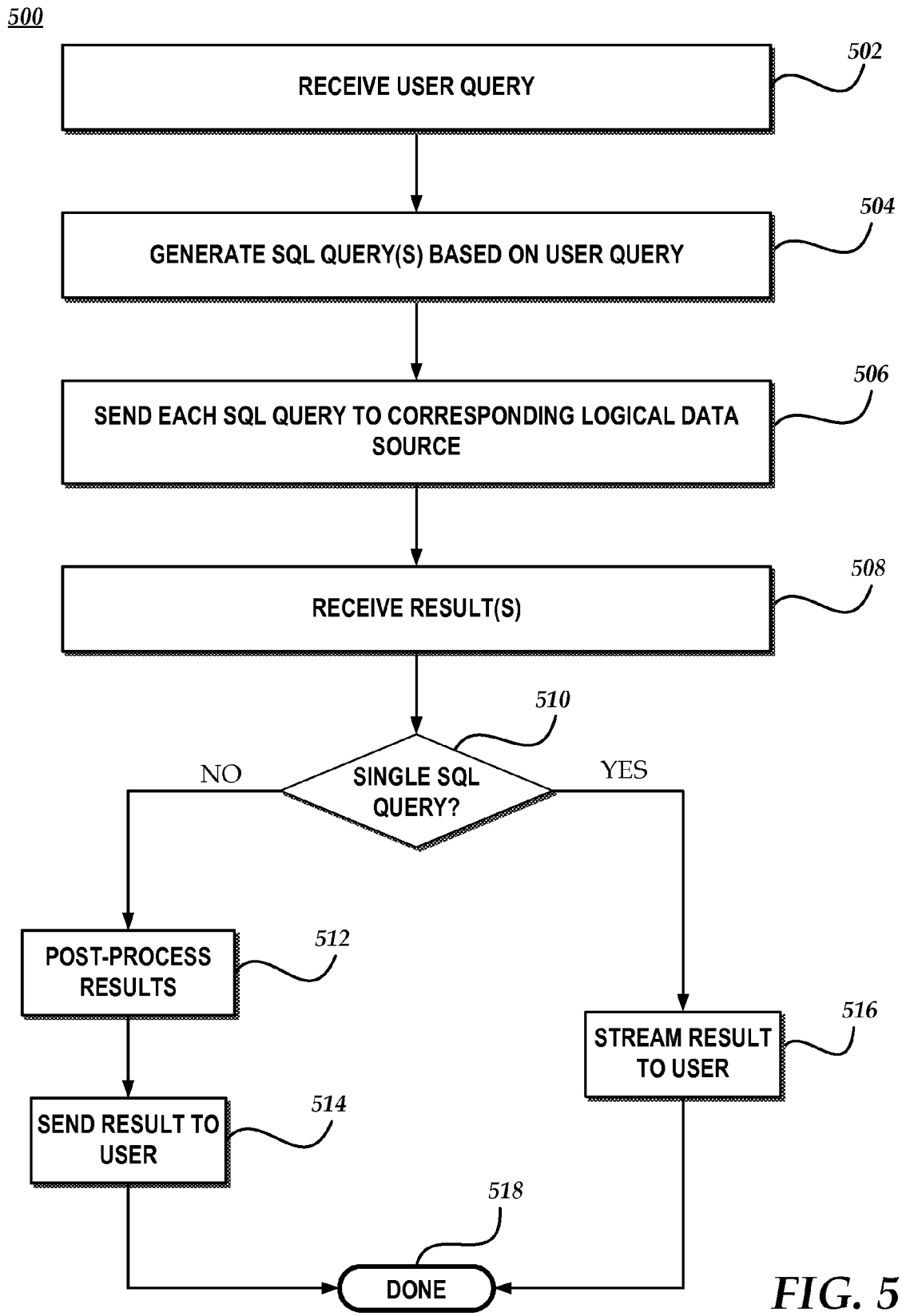
FIG. 5 is a flow diagram illustrating an example embodiment of a process 500 for providing a user with a response to a query, in accordance with some of the mechanisms described herein.

FIG. 5 is a flow diagram illustrating an example embodiment of a process 500 for providing a user with a response to a query, in accordance with some of the mechanisms described herein. Process 500, or a portion thereof, may be performed by various embodiments of system 100, system 200, or a variation thereof. Components of systems 100 or 200 are used as examples of an implementation herein, though in various embodiments, the correspondence of process actions and components may vary. The illustrated portions of process 500 may be initiated at block 502, where a user query is received. The request may be received by server 106, or specifically by query processor 108.

The process may flow to block 504, where one or more SQL queries may be generated, based on the user query. The process may flow to block 506, where each SQL query is sent to a corresponding data source. Databases 112 and 116 are examples of such data sources. The mechanisms described herein enable generation of calculations that are not specified by predefined measures in the model, or that include functions that are supported by a corresponding data source but not included in the data model, providing for additional flexibility in the user queries that may be used. In many configurations, the cartridge file exposes more functionality than the model. As described herein, the system may use the specifications of the cartridge file to enable user queries that extend beyond the data model.

The process may flow to block 508, where a result set corresponding to each SQL query is received. Thus, there may be one or more result sets. The process may flow to decision block 510, where a determination is made of whether a single SQL query was used. If a single SQL query was used, and a single result set was received, the process may flow to block 516, where the result set may be forwarded to the requesting client. The forwarding may be performed by streaming the result set to the client. The process may flow to done block 518, and exit or return to a calling program. In such a case, it may be said that the single SQL query is equivalent to the user query, in that it retrieves a result set that matches the user results sent to the user, without additional rows or data elements being filtered out or other post-processing performed.

Though not illustrated in FIG. 5, in one embodiment when a result set is streamed to a user, the user has an option of cancelling the receipt of the results. Upon receiving a cancel command from a user, server 106 may send a cancel command to the appropriate data source. Thus, a user may view a portion of the results and terminate undesired transmission of data from a data source to the server.

If, at decision block 510, it is determined that more than one SQL query was used, the process may flow to block 512, where the multiple result sets may be post-processed. As discussed herein, post-processing may include one or more operations that combine, filter, or transform results. Post-processing may include performing relational or scalar operations that are not supported by the data source from which the data was retrieved. Post-procesing may therefore provide capabilities beyond that provided by a data source. The process may flow to block 514, where a user result is sent to the user. The process may flow to done block 518, and flow to other actions, not shown, exit or return to a calling program.

Figure 6:
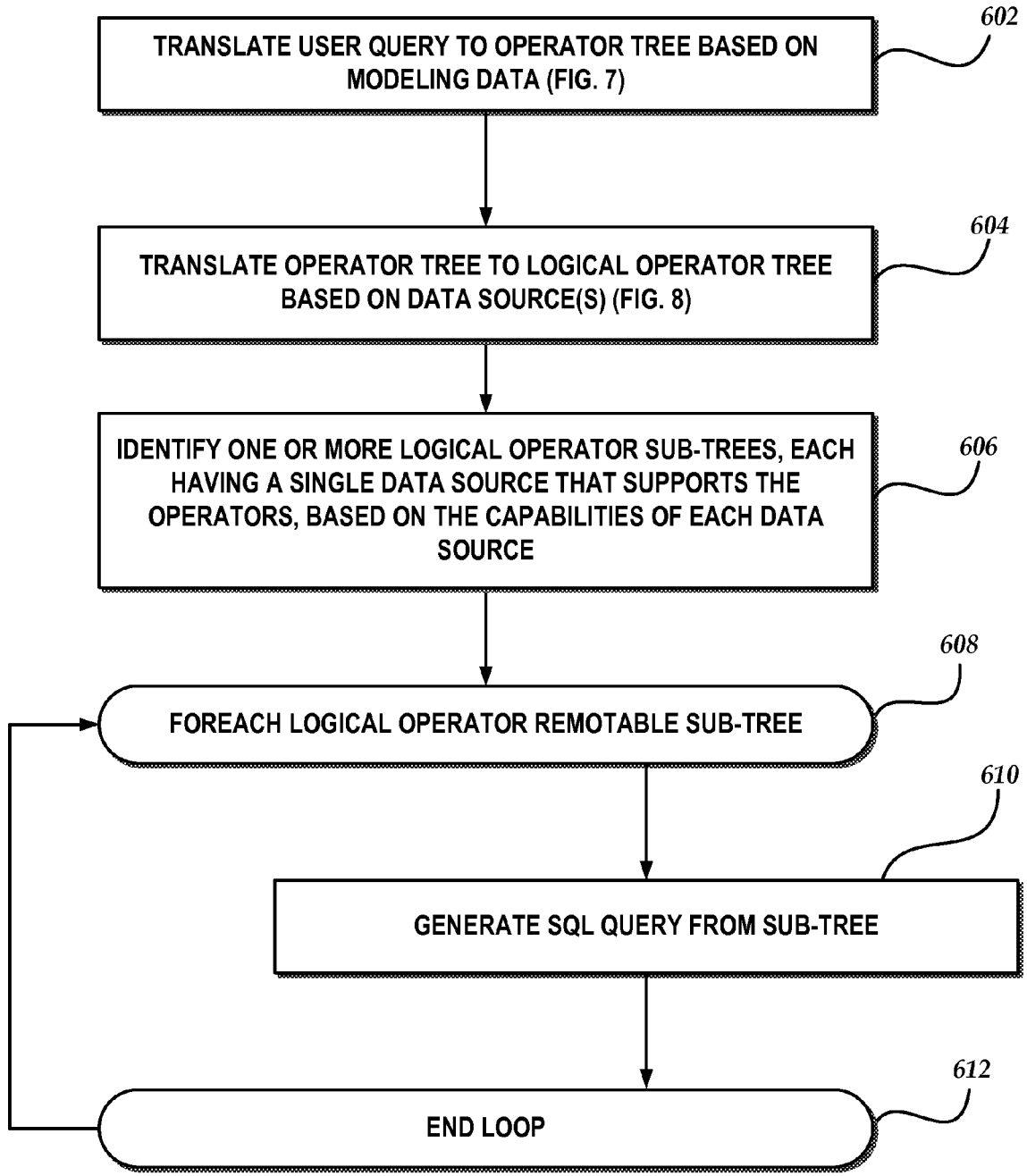
FIG. 6 is a flow diagram illustrating an example embodiment of a process 600 for generating one or more SQL queries from a user query.

FIG. 6 is a flow diagram illustrating an example embodiment of a process 600 for generating one or more SQL queries from a user query. Process 600 may be used to implement at least a portion of block 504 of FIG. 5. The illustrated portions of process 600 may be initiated at block 602, where a user query may be translated into an operator tree, such as operator tree 304 of FIG. 3. As illustrated in FIG. 3, this translation may be based on a data model, such as model 130.

Figure 8A:
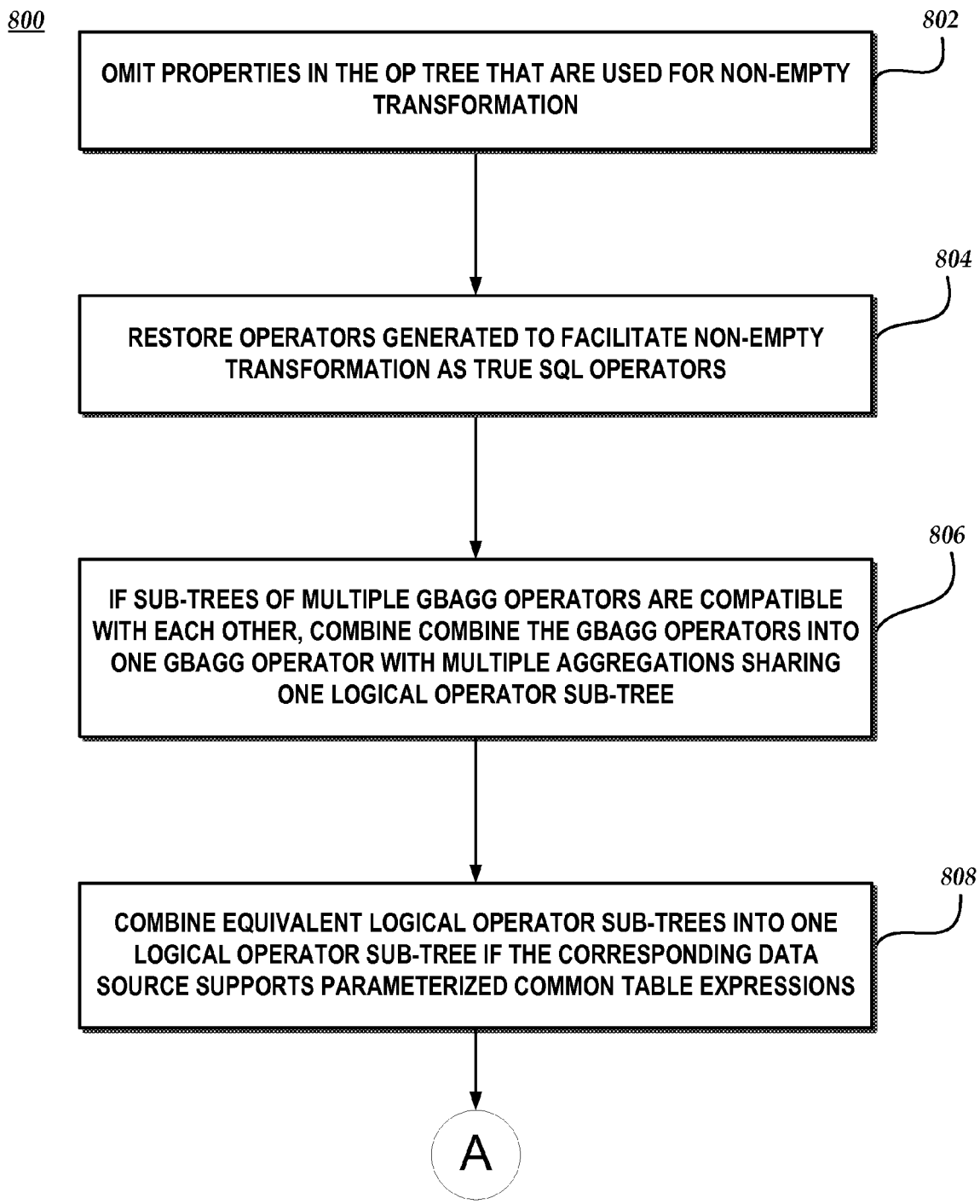
FIGS. 8A-B are a flow diagram illustrating an example embodiment of a process for translating an operator tree into a logical operator tree.
Figure 8B:
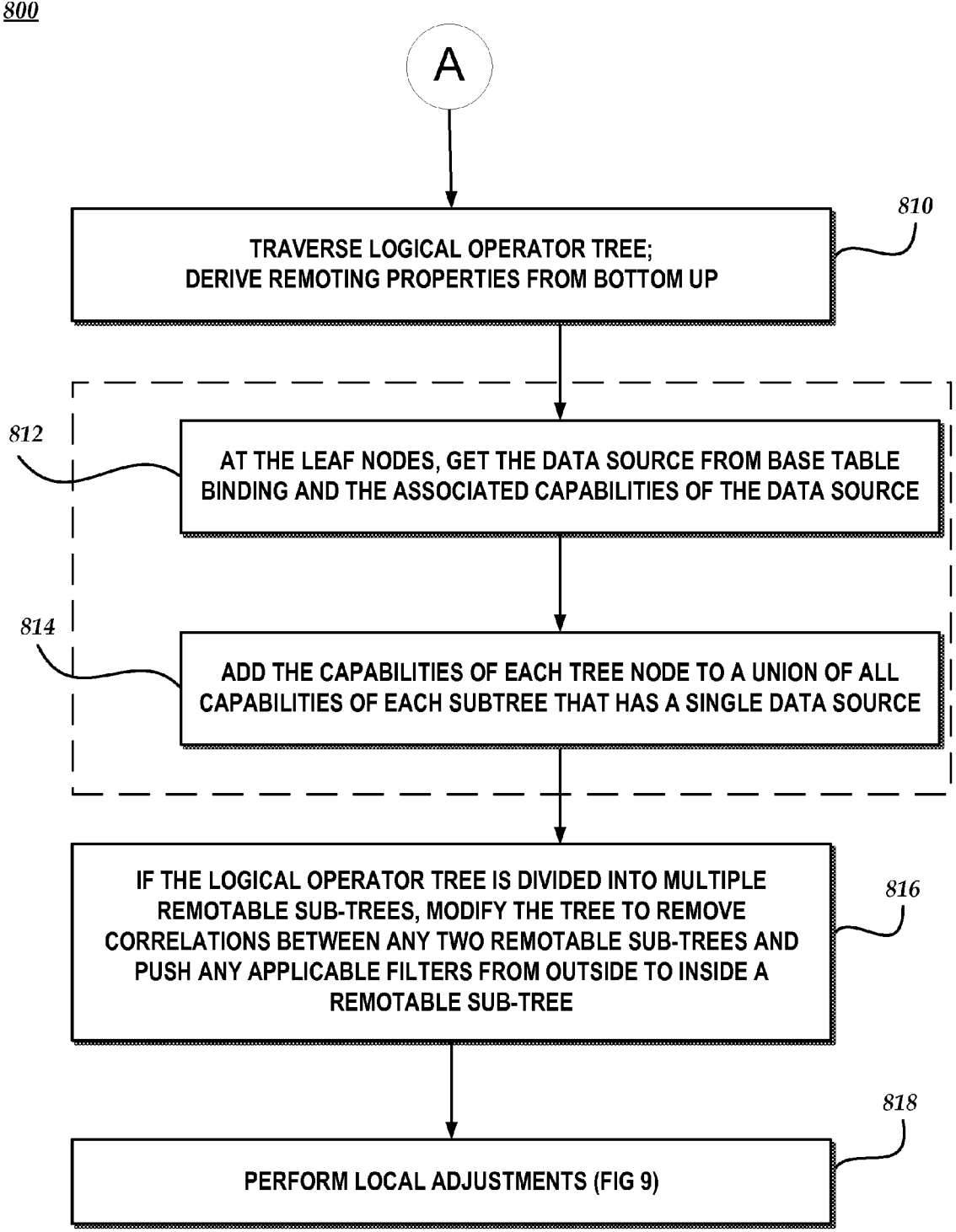

The process may flow to block 604, where the operator tree may be translated to a logical operator tree, such as logical operator tree 306 of FIG. 3. FIGS. 8A-B provide, in further detail, a process that may be performed as part of this translation, in one implementation.

The process may flow to block 606, where the logical operator tree may be traversed to identify one or more logical operator sub-trees, in which each sub-tree has a corresponding single data source that supports the operations represented by internal nodes of the sub-tree. Therefore, the query represented by each sub-tree may be remotable with respect to the corresponding data source. In one embodiment, each identified sub-tree is the maximum size that can be obtained with the aforementioned criteria of a single data source and support for each operation. A sub-tree that meets these two properties is referred to as "remotable."

In one embodiment, the identification of the remotable logical operator sub-trees, including the number of remotable sub-trees, is based on the capabilities of each data source. For example, if a query includes a combination SQL operator with data from two tables in a single data source, but the data source does not support the combination operator, two remotable sub-trees may be created, resulting in two SQL queries to the data source. If the data source supports the combination SQL operator, a single remotable sub-tree may be created, resulting in a single SQL query to the data source. In one embodiment, the process performs actions to minimize the number of remotable sub-trees corresponding to each data source, and therefore minimize the total number of remotable sub-trees. As discussed herein, one or more cartridge files with specifications of corresponding data sources may be used to determine maximum remotable logical operator sub-trees.

The process may flow to block 608, which begins a loop that iterates for each identified logical operator sub-tree. The loop is referred to herein as loop 608. It includes block 610 and is terminated by block 612. During each iteration, the sub-tree corresponding to the iteration is referred to as the "current" sub-tree. At block 610, an SQL query may be generated from the current sub-tree. Loop 608 may iterate one or more times. At block 612, upon completion of the iterations, loop 608 may exit. The process may flow to other actions, not shown, exit or return to a calling program. As discussed herein, a determination of a quantity of sub-trees may be based on capabilities of each data source. A quantity of SQL queries may be based on the quantity of logical operator sub-trees, and is therefore based on data source capabilities. A determination of the maximum remotable sub-trees may result in a minimum quantity of sub-trees, and therefore a minimum quantity of SQL queries.

SQL queries 312 and 314 are examples of SQL queries that may be generated by process 600. In one implementation, loop 608 may include generation of an abstract SQL query, which may be translated into an SQL query. In one implementation, an abstract SQL query is in the form of XML, though other representations may be used. A cartridge file may be used to translate an abstract SQL query into an SQL query.

In one embodiment, in some configurations a logical operator tree may be created that includes one or more internal nodes representing actions that are not supported by a target data source. One or more SQL queries may be generated, as described herein, for one or more branches of the logical operator tree. Upon receiving the one or more sets of results, post-processor 228 (FIG. 1) may perform the actions of such internal nodes.

In one embodiment, in a configuration with a query that is directed to more than one data source, one or more internal nodes of a logical operator tree may represent post-processing actions that are to be performed on the result sets of each data source. This is illustrated by box 512 of FIG. 5.

By generating SQL queries that include aggregations, joins, or other calculations, and directing the data sources to perform these operations, mechanisms described herein may cause a minimum amount of results to be returned from data sources. In some configurations, the results received by server 106 are the same results sent to the user. In particular, in one embodiment, an arbitrarily complex query may be processed so that the columns retrieved from data sources are the minimum set of columns that can be retrieved to answer the user query. This may reduce the amount of data transmitted from the data sources to the server. It may also reduce the amount of post-processing that is performed by server 106.

Figure 7:
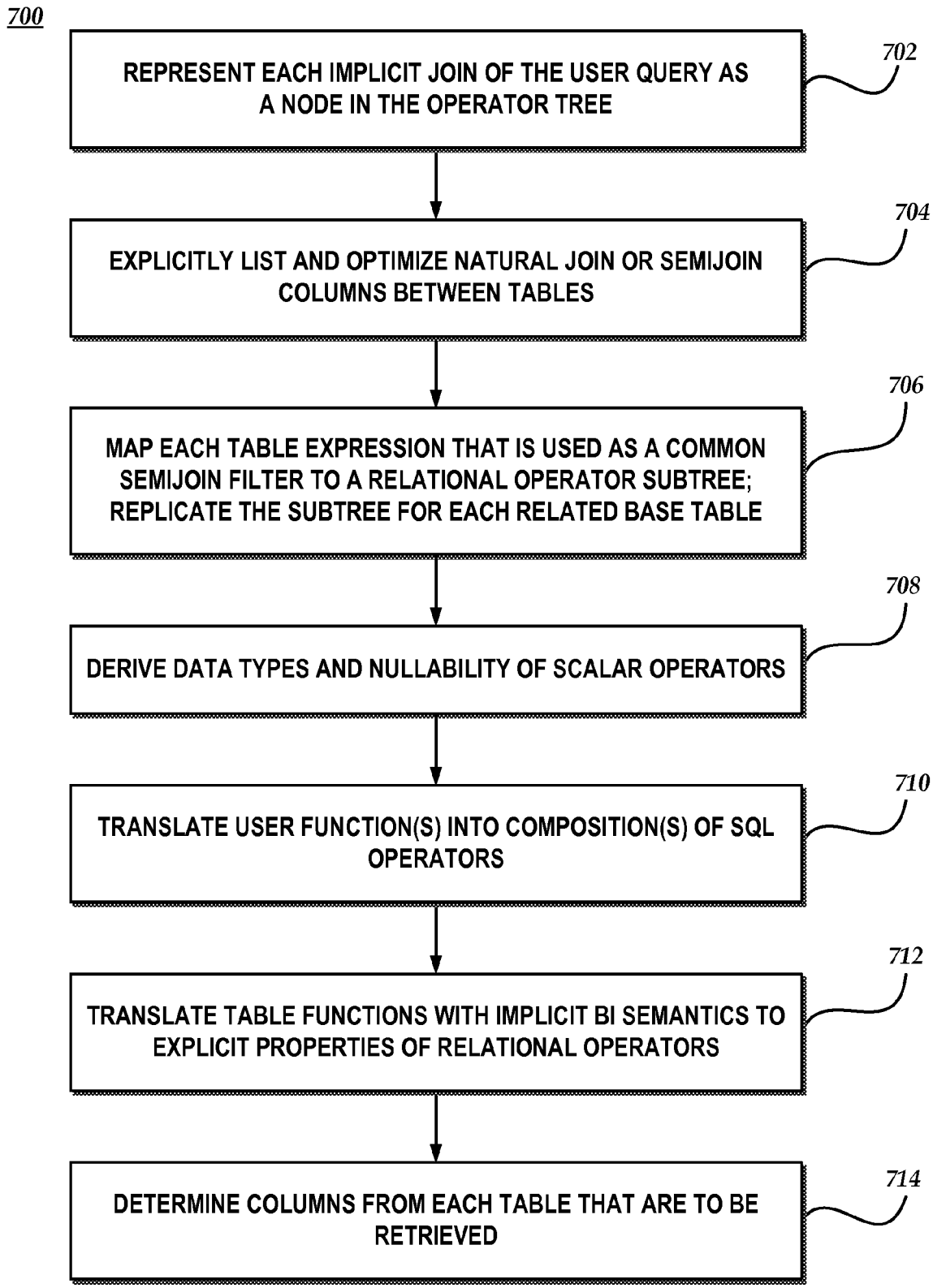
FIG. 7 is a flow diagram illustrating an example embodiment of a process for translating a user query into an operator tree.

FIG. 7 is a flow diagram illustrating an example embodiment of a process 700 for translating a user query into an operator tree. Process 700 may be used to implement at least a portion of block 602 of FIG. 6. Though process 700 is illustrated as a sequence of blocks, each block representing actions, the actions of process 700 may be implemented in a variety of ways and a variety of sequences. Additionally, any one or more blocks of process 700 may be omitted in any implementation. Thus, process 700 is to be viewed as a set of actions or rules that may be applied during creation of an operator tree.

The illustrated portions of process 700 may be initiated at block 702, where each implicit join of the user query is represented in the operator tree as one or more nodes. In one embodiment, a user query is represented using the data analysis expressions (DAX) formula language, though other languages or formats may be used. A user query may omit relationships between data tables. For example, a join between two tables may not be explicitly specified, though it may be implicit given the data model. In one implementation, the actions of block 702 include parsing the query, retrieving relationships from the model, and determining implicit joins. The process may include an explicit join operation in the operator tree to implement each implicit join from the query.

At block 704, natural join or semijoin columns between tables may be explicitly listed and optimized. At block 706, a table expression that is used as a common semijoin filter may be mapped to a relational operator sub-tree, and the sub-tree may be replicated for related base tables. At block 708, data types and nullability of scalar operators may be derived.

At block 710, one or more user functions may be translated into corresponding compositions of SQL operators. This action enables arbitrarily complex user queries to be processed, including recursive queries or queries having an arbitrary number of sub-query levels. In a composable query, the results of sub-queries may be combined in a higher level query. This results in nested queries. Thus, a composable user query may be processed in accordance with the mechanisms described herein. A complex query may include a union operator, which combines results from two sub-queries. The term arbitrarily complex query refers to a query that may have multiple levels of nested sub-queries, the number of levels not being limited by the logic of the processes described herein, though it may be limited by restrictions on computer memory or other resources.

At block 712, user table functions with implicit BI semantics may become explicit properties of relational operators. This may include determining whether to include a blank row in a dimension table, or whether to maintain duplicate rows in a table. At block 714, columns from each table that are to be retrieved may be determined.

FIGS. 8A-B are a flow diagram illustrating an example embodiment of a process 800 for translating an operator tree into a logical operator tree. Process 800 may be used to implement at least a portion of block 604 of FIG. 6. Though process 800 is illustrated as a sequence of blocks, each block representing actions, the actions of process 800 may be implemented in a variety of ways and a variety of sequences. Additionally, any one or more blocks of process 800 may be omitted in any implementation. Thus, process 800 is to be viewed as a set of actions or rules that may be applied during creation of a logical operator tree.

The illustrated portions of process 800 may be initiated at block 802, where properties in the operator tree that are used for non-empty transformations are omitted from inclusion in the logical operator tree. In one embodiment, a logical operator tree has a property that every intermediate node is an SQL relational node or a scalar function from a system function library.

At block 804, operators that are generated to facilitate non-empty transformation may be restored as true SQL operators. For example, in one embodiment, Filter and Aggregate may be unary operators in an operator tree. Their counterparts in the logical operator tree, Filter and GBAgg, respectively, correspond to SQL operators Selection and GBAgg. Thus, Filter and Aggregate unary operators may be converted to their respective logical operator tree operators, each having a corresponding SQL operator.

At block 806, multiple GbAgg operators may be combined into a single GbAgg operator with multiple aggregations sharing a single logical operator sub-tree if it is determined that logical operator sub-trees in each of the GbAgg operator are compatible with each other.

At block 808, equivalent logical operator sub-trees may be combined into a single logical operator sub-tree if the corresponding data source supports parameterized common table expressions.

Process 800 continues on FIG. 8B. At block 810, the process may traverse the logical operator tree, deriving remoting properties. In one implementation, the traversal may be performed from the bottom of the tree toward the root. In the illustrated example embodiment, blocks 812 and 814 represent actions that may be performed during the traversal of the logical operator tree. At block 812, the data source and its associated capabilities may be retrieved at each leaf node. Capabilities may include, for example, whether the data source supports certain relational operators, scalar functions, or the like. At block 814, the capabilities corresponding to each tree node may be added to a set of capabilities representing the set of capabilities for the sub-tree containing the node and corresponding to a single data source.

At block 816, if the logical operator tree is divided into multiple remotable sub-trees, the tree may be modified to remove correlations between any two remotable sub-trees. The modification may push any applicable filters from outside to inside a remotable sub-tree.

At block 818, local adjustments to the logical operator tree may be performed. Examples of local adjustments are illustrated in FIG. 9 and discussed herein.

Figure 9:
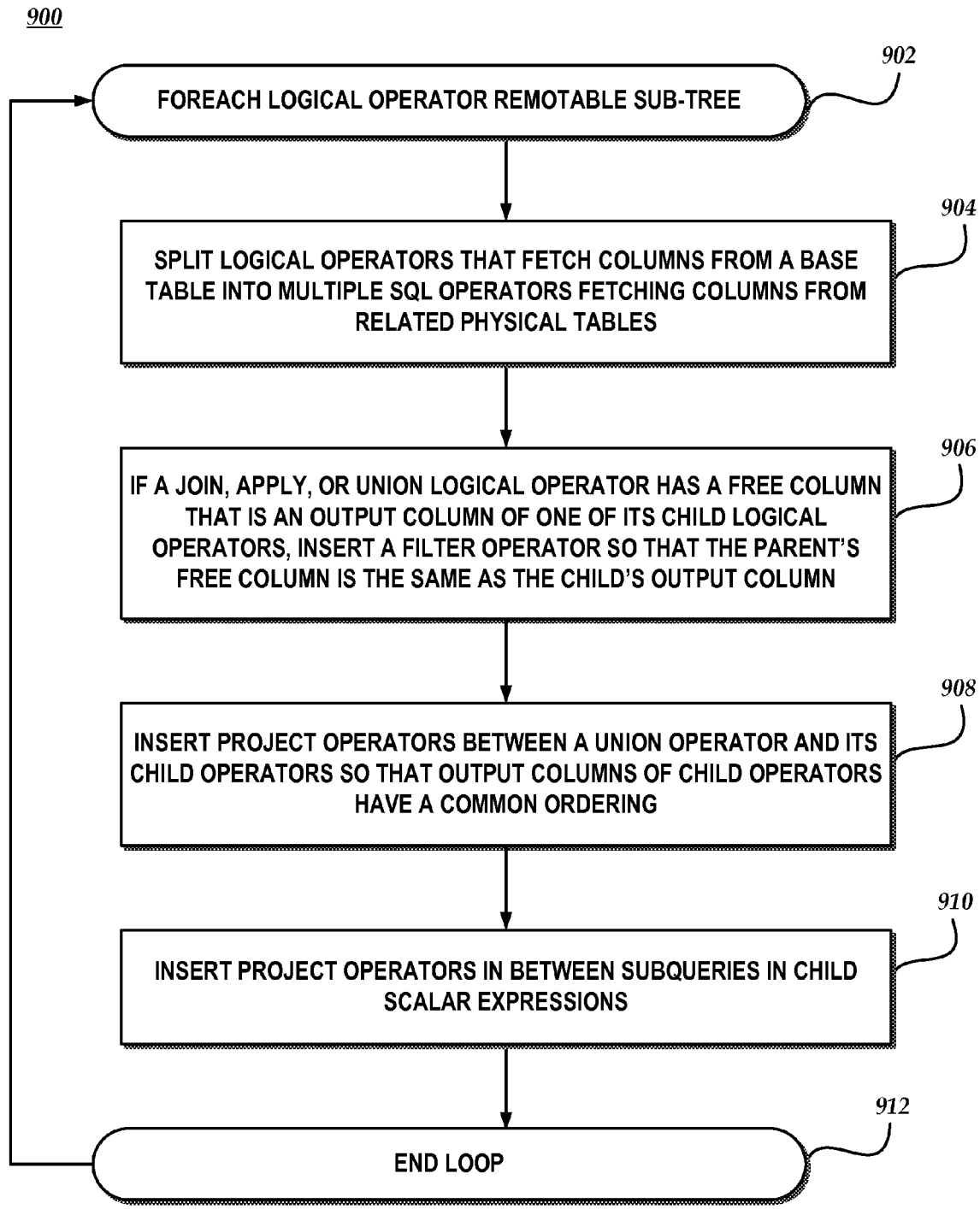
FIG. 9 is a flow diagram illustrating an example embodiment of a process for performing local adjustments to a logical operator tree.

FIG. 9 is a flow diagram illustrating an example embodiment of a process 900 for performing local adjustments to a logical operator tree. Process 900 may be used to implement at least a portion of block 818 of FIG. 8B. Though process 900 is illustrated as a sequence of blocks, each block representing actions, the actions of process 900 may be implemented in a variety of ways and a variety of sequences. Additionally, any one or more blocks of process 900 may be omitted in any implementation. Thus, process 900 is to be viewed as a set of actions or rules that may be applied during creation of a logical operator tree. Some of the local adjustments may be based on one or more available data sources, as represented by their respective cartridge files.

The illustrated portions of process 900 may be initiated at loop 902, which begins a loop that iterates for each logical operator remotable sub-tree that has been identified. Loop 902 includes blocks 904-910, and is terminated by block 912. During each iteration, the actions are applied to the current sub-tree.

At block 904, actions may include splitting logical operators that fetch columns from a base table in the model into multiple SQL operators that fetch columns from related physical tables. In one embodiment, a base table may be implemented as a root physical table with outer joins of related physical tables. Therefore, this implementation is handled by referencing the related physical tables.

At block 906, if a join, apply, or union logical operator has a free column that is an output column of one of its child logical operators, a filter operator may be inserted so that the parent's free column is the same as the child's output column.

At block 908, project operators may be optionally inserted between a union operator and its child operators, so that output columns of child operators are ordered in the same way.

At block 910, project operators may be inserted in between sub-queries in child scalar expressions. This may be performed to handle SQL operators that do not allow sub-queries in their child scalar expressions.

At block 912, upon completion of the iterations, loop 902 may exit. The process may flow to other actions, not shown, exit, or return to a calling program, such as process 800.

FIG. 10 is a block diagram showing one embodiment of a computing device 1000, illustrating selected components of a computing device that may be used to implement mechanisms described herein, including server 106 and processes 500, 600, 700, or 800. Computing device 1000 may include many more components than those shown, or may include less than all of those illustrated. Computing device 1000 may be a standalone computing device or part of an integrated system, such as a blade in a chassis with one or more blades. Though the components of computing device 1000 are illustrated as discrete components, any one or more of them may be combined or integrated into an integrated circuit, such as an ASIC.

As illustrated, computing device 1000 includes one or more processors 1002, which perform actions to execute instructions of various computer programs. In one configuration, each processor 1002 may include one or more central processing units, one or more processor cores, one or more ASICs, cache memory, or other hardware processing components and related program logic. As illustrated, computing device 1000 includes an operating system 1004. Operating system 1004 may be a general purpose or special purpose operating system. The Windows® family of operating systems, by Microsoft Corporation, of Redmond, Wash., includes examples of operating systems that may execute on computing device 1000.

In one embodiment, computing device 1000 includes one or more graphics processing units (GPU) 1016. A GPU is a processor that is configured to perform graphics operations, such as rendering a graphic image, or to perform stream processing.

Memory and storage 1006 may include one or more of a variety of types of non-transitory computer storage media, including volatile or non-volatile memory, RAM, ROM, solid-state memory, disk drives, optical storage, or any other medium that can be used to store digital information.

Memory and storage 1006 may store one or more components described herein or other components. In one embodiment, memory and storage 1006 stores query processor 108, post-processor 228. In various embodiments, one or more of these components may be omitted from memory and storage 1006. In some embodiments, at least a portion of one or more components may be implemented in a hardware component, such as an ASIC. In various configurations, multiple components implementing the functions or including the data of these components may be distributed among multiple computing devices. Communication among various distributed components may be performed over a variety of wired or wireless communications mechanisms.

In one embodiment, memory and storage 1006 stores one or more data structures, such as model 130, operator tree 304, and logical operator tree 306. Each of these data structures may be implemented or stored in a variety of ways, including being distributed across multiple computing devices.

Any one or more of the components illustrated as stored in memory and storage 1006 may be moved to different locations in RAM, non-volatile memory, or between RAM and non-volatile memory by operating system 1004 or other components. In some configurations, these components may be distributed among one or more computing devices, including computing devices that are remotely located from each other.

Computing device 1000 may include a video display adapter 1012 that facilitates display of data, scene frames, or other information to a user. Though not illustrated in FIG. 10, computing device 1000 may include a basic input/output system (BIOS), and associated components. Computing device 1000 may also include a network interface unit 1010 for communicating with a network. Software components, such as those stored in memory and storage 1006, may be received via transitory media and network interface unit 1010. Computing device 1000 may include one or more display monitors 1014. Embodiments of computing device 1000 may include one or more input devices (not shown), such as a keyboard, pointing device, touch screen, keypad, audio component, microphone, voice recognition component, or other input/output mechanisms.

It will be understood that each block of the flowchart illustrations of FIGS. 5-8, and combinations of blocks in each flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of facilitating a response to a user query, the method comprising, at one or more servers:
    a) receiving an arbitrarily complex user query;
    b) translating the user query into an operator graph based on a data model;
    c) generating a logical operator graph from the operator graph, the logical operator graph representing a composable SQL query that includes a plurality of sub-queries;
    d) generating one or more SQL queries from the logical operator graph, each SQL query directed to a corresponding data source, each data source having exactly one corresponding SQL query;
    e) sending each of the one or more SQL queries to its corresponding data source;
    f) receiving, from each data source, a corresponding result set;
    g) if more than one result set is received, combining the result sets to produce a user response; and
    selectively streaming at least a portion of each corresponding result set to a client device.

2. The computer-based method of claim 1, generating one or more SQL queries comprising generating exactly one SQL query, and sending each of the one or more SQL queries comprising sending the exactly one SQL query, and wherein selectively streaming comprises streaming a portion of a result set prior to receiving the entire result set.

3. The computer-based method of claim 1, the user query comprising a composable query, further comprising sending one single SQL remotable query to its corresponding data source, and streaming the corresponding result set to a client device.

4. The computer-based method of claim 1, the user query comprising a composable query represented in Data Analysis Expressions (DAX) formula language, further comprising streaming the corresponding result set from the data source to a client device without performing post-processing.

5. The computer-based method of claim 1, the user query comprising a composable query specifying a function, further comprising generating one single SQL query that includes an SQL operation corresponding to the function, the function not included in the data model.

6. The computer-based method of claim 1, further comprising generating the one or more SQL queries to return an amount equivalent to an amount of data requested by the user query.

7. The computer-based method of claim 1, further comprising receiving an additional user query and, in response, generating one or more additional SQL queries directed to a corresponding data source, a quantity of the one or more additional SQL queries based on a capability set of the corresponding data source.

8. The computer-based method of claim 1, further comprising receiving an additional user query and, in response, generating one or more additional SQL queries, each directed to a corresponding data source, receiving at least one additional result set in response to the one or more additional SQL queries, and selectively performing post-processing of the at least one additional result set based on a capability set of the corresponding data source.

9. The computer-based method of claim 1, selectively streaming comprising streaming a result set to the client device by bypassing the one or more servers.

10. The computer-based method of claim 1, wherein generating the logical operator graph comprises:
    a) omitting properties that are used for non-empty transformations; and
    b) if a corresponding data source supports parameterized expressions combining logical operator sub-trees.

11. A computer-based system for facilitating a response to a user query, comprising:
    a) a query processor configured to perform actions including:
        i) receiving the user query;
        ii) generating an operator graph based on a data model;
        iii) translating the operator graph into a logical operator graph representing a composable SQL query that includes a plurality of sub-queries;
        iv) generating the composable SQL query based on the logical operator graph, the composable SQL query being remotable to a target data source;
        v) sending the composable SQL query to the target data source; and
    b) a response management component configured to perform actions including:
        i) a receiving a response set from the target data source; and
        ii) causing the response set to be sent to a client device by selectively streaming at least a portion of the response set to the client device.

12. The computer-based system of claim 11, the response management component configured to cause a portion of the response set to be sent to the client device prior to receiving the entire response set without performing post-processing of the response set.

13. The computer-based system of claim 11, further comprising a post-processing component that performs a post-processing operation on the response set only if the operation is not supported by the data source.

14. A computer-readable storage memory comprising computer program instructions for processing a complex user query, the program instructions executable by one or more processors to perform actions including:
    a) receiving the user query;
    b) generating a logical operator graph representative of the user query, the logical operator graph representing a composable SQL query that includes a plurality of sub-queries;

c) generating the composable SQL query based on the logical operator graph and a capability set corresponding to a data source, the composable SQL query being remotable to the data source and including a plurality of SQL aggregations or manipulations;
d) sending the composable SQL query to the data source;
e) receiving a response set from the data source; and
f) sending the response set to a client;
wherein the logical operator graph is processed so that each data source returns a minimum number of columns that are sufficient to answer the complex user query.

15. The computer-readable storage memory of claim 14, the actions further including streaming the response set to the client without performing post-processing of the response set.

16. The computer-readable storage memory of claim 14, the action further including selectively creating another SQL query and sending the other SQL query to the data source, based on the capabilities of the data source.

17. The computer-readable storage memory of claim 14, the actions further including performing post-processing of the response set, the post-processing limited to one or more scalar functions that are not supported by the data source.

18. The computer-readable storage memory of claim 14, the user query comprising a query represented in DAX formula language.

19. The computer-readable storage memory of claim 14, the actions further including modifying the logical operator graph to remove a correlation between two remotable subgraphs.

20. The computer-readable storage memory of claim 14, the actions further including if a logical operator has a free column that is an output column of a child node logical operator, inserting a filter operator to cause the output column to be equivalent to the free column.

* * * * *